(12) United States Patent
Wang et al.

(10) Patent No.: US 11,177,568 B2
(45) Date of Patent: Nov. 16, 2021

(54) ANTENNA RESOURCE SCHEDULING METHOD AND DEVICE

(71) Applicant: HUAWEI TECHNOLOGIES CO., LTD., Guangdong (CN)

(72) Inventors: Xiaoyi Wang, Shanghai (CN); Enliang Xiong, Shanghai (CN); Jintao Wang, Shanghai (CN); Jia Xu, Shanghai (CN); Qiuliang Xu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/498,858

(22) PCT Filed: Sep. 26, 2017

(86) PCT No.: PCT/CN2017/103527
§ 371 (c)(1),
(2) Date: Sep. 27, 2019

(87) PCT Pub. No.: WO2018/176767
PCT Pub. Date: Oct. 4, 2018

(65) Prior Publication Data
US 2020/0052400 A1    Feb. 13, 2020

(30) Foreign Application Priority Data
Apr. 1, 2017   (CN) .......................... 201710214412.9

(51) Int. Cl.
*H01Q 5/335*    (2015.01)
*H04B 1/04*    (2006.01)
*H04L 5/14*    (2006.01)

(52) U.S. Cl.
CPC .............. *H01Q 5/335* (2015.01); *H04B 1/04* (2013.01); *H04L 5/14* (2013.01)

(58) Field of Classification Search
CPC . H01Q 1/24; H01Q 5/335; H04B 1/04; H04B 1/18; H04L 5/14; H04L 25/0278; H04L 25/14
See application file for complete search history.

(56) References Cited

U.S. PATENT DOCUMENTS 10,347,464 B2 *   7/2019   Sato .................. H01J 37/32183
2006/0183431 A1   8/2006   Chang et al.
(Continued)

FOREIGN PATENT DOCUMENTS

| CN | 101133560 A | 2/2008 |
| CN | 101835250 A | 9/2010 |

(Continued)

OTHER PUBLICATIONS

International Search Report and Written Opinion dated Jan. 5, 2018, issued in counterpart Application No. PCT/CN2017/103527, with English translation. (18 pages).

(Continued)

*Primary Examiner* — Kan Yuen
(74) *Attorney, Agent, or Firm* — Westerman, Hattori, Daniels & Adrian, LLP

(57) ABSTRACT

An antenna resource scheduling method and device for improving radiation efficiency of an antenna in a sideband area of an operating band by obtaining an operating frequency of an antenna, where the operating frequency is a frequency currently used by the device during communication; determining an operating band based on the operating frequency, where the operating band is a band to which the operating frequency belongs; determining a target impedance parameter based on the operating band and the operating frequency; and adjusting an impedance parameter of an impedance circuit to the target impedance parameter.

7 Claims, 11 Drawing Sheets

(56) References Cited

U.S. PATENT DOCUMENTS

| | | | |
|---|---|---|---|
| 2006/0183442 A1 | 8/2006 | Chang et al. | |
| 2013/0069737 A1 | 3/2013 | See et al. | |
| 2015/0222321 A1* | 8/2015 | Aandersson | H04L 5/14 370/278 |
| 2016/0006476 A1 | 1/2016 | El-Rayis et al. | |
| 2017/0026022 A1* | 1/2017 | Craninckx | H03H 7/463 |
| 2019/0051986 A1 | 2/2019 | Li et al. | |
| 2019/0334565 A1* | 10/2019 | Itkin | H04B 17/12 |

FOREIGN PATENT DOCUMENTS

| | | |
|---|---|---|
| CN | 101964884 A | 2/2011 |
| CN | 103828247 A | 5/2014 |
| CN | 105337631 A | 2/2016 |
| CN | 106299609 A | 1/2017 |
| EP | 3026822 A1 | 6/2016 |
| WO | 2015089841 A1 | 6/2015 |

OTHER PUBLICATIONS

Extended (Supplementary) European Search Report dated Jan. 20, 2020, issued in counterpart application No. 17902603.4. (7 pages).
Office Action dated Mar. 13, 2020, issued in counterpart CN Application No. 201780088153.8, with English Translation. (16 pages).

\* cited by examiner

ANTENNA RESOURCE SCHEDULING METHOD AND DEVICE

CROSS-REFERENCE TO RELATED APPLICATION

This application is a national stage of International Application No. PCT/CN2017/103527, filed on Sep. 26, 2017, which claims priority to Chinese Patent Application No. 201710214412.9, filed on Apr. 1, 2017. Both of the aforementioned applications are hereby incorporated by reference in their entireties.

TECHNICAL FIELD

The present invention relates to the field of antenna technologies, and in particular, to an antenna resource scheduling method and a device.

BACKGROUND

To facilitate allocation and management of a frequency resource, the frequency resource is divided into a plurality of bands bands in a 3rd generation partnership project (3rd generation partnership project, 3GPP) protocol, and each band corresponds to one frequency range. Different bands may be configured for different operators, different network standards, or different duplex modes. For example, a frequency division duplex (frequency division duplexing, FDD) long term evolution (long term evolution, LTE) system corresponds to a band numbered 8 (namely, an FDD LTE band 8), and a frequency range corresponding to the FDD LTE band 8 includes an uplink band 880 MHz to 915 MHz and a downlink band 925 MHz to 960 MHz. A mobile phone may send/receive a signal in different bands by using an antenna.

An FDD system may have a plurality of bands. For each band, the antenna of the mobile phone corresponds to one frequency response curve, and the frequency response curve is used to represent radiation efficiency of the antenna at each frequency in the band. For example, refer to a frequency response curve of the antenna in the FDD LTE band 8 in FIG. 1. It can be learned from FIG. 1 that the antenna has higher radiation efficiency at each frequency in a center area close to a center frequency in the band, and usually has lower radiation efficiency at each frequency in a sideband area of the band, and therefore the antenna has poorer performance in the sideband area of the band.

SUMMARY

Embodiments of the present invention provide an antenna resource scheduling method and a device, to improve radiation efficiency of an antenna in a sideband area of a band.

To achieve the foregoing objective, the following technical solutions are used in the embodiments of the present invention.

According to a first aspect, an embodiment of the present invention provides an antenna resource scheduling method, applied to a device, where the device includes an antenna and an impedance circuit of the antenna, and the method includes: first, obtaining, by the device, an operating frequency of the antenna, where the operating frequency is a frequency currently used by the device during communication; then, determining, by the device, an operating band based on the operating frequency, where the operating band is a band to which the operating frequency belongs; then, determining, by the device, a target impedance parameter based on the operating band and the operating frequency; and finally, adjusting, by the device, an impedance parameter of the impedance circuit to the target impedance parameter.

In this way, the device can adjust the impedance parameter of the impedance circuit of the antenna based on the operating band and the operating frequency, and therefore can adjust a resonance frequency of the antenna. This is equivalent that the device can left or right shift a frequency response curve of the antenna in the operating band, and therefore can separately improve radiation efficiency of the antenna in a left sideband area and a right sideband area of the operating band, thereby improving operating bandwidth of the antenna.

With reference to the first aspect, in a possible implementation, the determining, by the device, a target impedance parameter based on the operating band and the operating frequency is specifically: when the operating frequency is greater than a preset frequency in the operating band, determining, by the device, that the target impedance parameter is a first impedance parameter; or when the operating frequency is less than a preset frequency in the operating band, determining, by the device, that the target impedance parameter is a second impedance parameter; or when the operating frequency is equal to a preset frequency in the operating band, determining, by the device, that the target impedance parameter is a first impedance parameter or a second impedance parameter.

In this way, the device can determine different target impedance parameters based on a value relationship between the operating frequency and the preset frequency in the operating band to which the operating frequency belongs, and therefore can obtain different frequency response curves based on the different target impedance parameters.

With reference to the first aspect and the foregoing possible implementation, in another possible implementation, the determining, by the device, a target impedance parameter based on the operating band and the operating frequency is specifically: determining, by the device based on the operating frequency and a plurality of preset ranges in the operating band, a target range to which the operating frequency belongs, where the target range is a preset range to which the operating frequency belongs; and determining, by the device, the target impedance parameter based on the target range and a mapping relationship, where the mapping relationship includes a correspondence between the plurality of preset ranges and impedance parameters.

In this way, the device can determine different target impedance parameters based on different target ranges to which the operating frequency belongs, and therefore can obtain different frequency response curves based on the different target impedance parameters.

With reference to the first aspect and the foregoing possible implementations, in another possible implementation, the plurality of preset ranges belong to an uplink band, or the plurality of preset ranges belong to a downlink band.

In this way, only the uplink band may be divided into the plurality of preset ranges, and the downlink band is not divided; or only the downlink band may be divided into the plurality of preset ranges, and the uplink band is not divided.

According to a second aspect, an embodiment of the present invention provides a device, where the device includes an antenna, an impedance circuit of the antenna, an obtaining unit, and a processing unit, and the processing unit includes a modem or a central processing unit CPU. The obtaining unit is configured to obtain an operating frequency of the antenna, where the operating frequency is a frequency currently used by the device during communication. The processing unit is configured to: determine an operating band based on the operating frequency, where the operating band is a band to which the operating frequency belongs; determine a target impedance parameter based on the operating band and the operating frequency; and adjust an impedance parameter of the impedance circuit to the target impedance parameter.

With reference to the second aspect, in a possible implementation, that the processing unit is configured to determine a target impedance parameter based on the operating band and the operating frequency specifically includes: when the operating frequency is greater than a preset frequency in the operating band, determining that the target impedance parameter is a first impedance parameter; or when the operating frequency is less than a preset frequency in the operating band, determining that the target impedance parameter is a second impedance parameter; or when the operating frequency is equal to a preset frequency in the operating band, determining that the target impedance parameter is a first impedance parameter or a second impedance parameter.

With reference to the second aspect and the foregoing possible implementation, in another possible implementation, that the processing unit is configured to determine a target impedance parameter based on the operating band and the operating frequency specifically includes: determining, based on the operating frequency and a plurality of preset ranges in the operating band, a target range to which the operating frequency belongs, where the target range is a preset range to which the operating frequency belongs; and determining the target impedance parameter based on the target range and a mapping relationship, where the mapping relationship includes a correspondence between the plurality of preset ranges and impedance parameters.

According to a third aspect, an embodiment of the present invention provides a device, including an antenna, an impedance circuit of the antenna, a processor, a memory, a communications interface, and a bus. The antenna, the impedance circuit of the antenna, the processor, the memory, and the communications interface are connected by using the bus. The communications interface is configured to exchange data. The memory is configured to store an instruction. The processor is configured to invoke the instruction stored in the memory, to: obtain an operating frequency of the antenna, where the operating frequency is a frequency currently used by the device during communication; determine an operating band based on the operating frequency, where the operating band is a band to which the operating frequency belongs; determine a target impedance parameter based on the operating band and the operating frequency; and adjust an impedance parameter of the impedance circuit to the target impedance parameter.

With reference to the third aspect, in a possible implementation, that the processor is configured to determine a target impedance parameter based on the operating band and the operating frequency specifically includes: when the operating frequency is greater than a preset frequency in the operating band, determining that the target impedance parameter is a first impedance parameter; or when the operating frequency is less than a preset frequency in the operating band, determining that the target impedance parameter is a second impedance parameter; or when the operating frequency is equal to a preset frequency in the operating band, determining that the target impedance parameter is a first impedance parameter or a second impedance parameter.

With reference to the third aspect and the foregoing possible implementation, in another possible implementation, that the processor is configured to determine a target impedance parameter based on the operating band and the operating frequency specifically includes: determining, based on the operating frequency and a plurality of preset ranges in the operating band, a target range to which the operating frequency belongs, where the target range is a preset range to which the operating frequency belongs; and determining the target impedance parameter based on the target range and a mapping relationship, where the mapping relationship includes a correspondence between the plurality of preset ranges and impedance parameters.

According to a fourth aspect, an embodiment of the present invention provides a chip. The chip includes a processor and a memory. The memory is configured to be coupled to the processor, and stores a program instruction and data that are necessary for the chip. The processor is configured to execute the program instruction stored in the memory, to enable the chip to perform the antenna resource scheduling method according to any one of the first aspect or the implementations of the first aspect.

According to a fifth aspect, an embodiment of the present invention provides a computer readable storage medium, including an instruction. When the instruction runs on a device, the device is enabled to perform the antenna resource scheduling method according to any one of the first aspect or the implementations of the first aspect.

According to a sixth aspect, an embodiment of the present invention provides a computer program product including an instruction. When the computer program product runs on a device, the device is enabled to perform the antenna resource scheduling method according to any one of the first aspect or the implementations of the first aspect.

With reference to any one of the foregoing aspects or any one of the foregoing possible implementations, in another possible implementation, the operating band is a band corresponding to frequency division duplex FDD.

For beneficial effects in the second aspect to the sixth aspect, refer to the related descriptions in the first aspect. Details are not described herein again.

DESCRIPTION OF EMBODIMENTS

For ease of understanding, example descriptions of some concepts related to the embodiments of the present invention are provided for reference, as shown below.

Band: a band that has a fixed frequency range and that is obtained through division based on a standard communications protocol such as a 3GPP protocol and a 3GPP2 protocol in a communications system. In the following embodiments of the present invention, a band is replaced with a band. For example, in a division manner, for a correspondence between a band and a frequency range in an LTE system, refer to Table 1.

TABLE 1

| band | Uplink band<br>Lower limit frequency to<br>upper limit frequency | Downlink band<br>Lower limit frequency to<br>upper limit frequency |
|---|---|---|
| 1 | 1920 MHz to 1980 MHz | 2110 MHz to 2170 MHz |
| 2 | 1850 MHz to 1910 MHz | 1930 MHz to 1990 MHz |
| 3 | 1710 MHz to 1785 MHz | 1805 MHz to 1880 MHz |
| 4 | 1710 MHz to 1755 MHz | 2110 MHz to 2155 MHz |
| ... | ... | ... |
| 8 | 880 MHz to 915 MHz | 925 MHz to 960 MHz |
| ... | ... | ... |

Sideband: a frequency range that is in a band and that is close to an upper limit frequency or a lower limit frequency of the band.

Frequency response curve: a curve showing that radiation efficiency changes with a frequency.

Radiation efficiency: a relative relationship between energy radiated from an antenna and energy used by a radio frequency signal, which may be measured by using a parameter such as antenna efficiency or an antenna gain.

Antenna efficiency (efficiency): a ratio of power radiated from an antenna (to be specific, power that is effectively converted into an electromagnetic wave) to active power input to the antenna.

Antenna gain (gain): a ratio between power densities of signals that are respectively generated by an actual antenna and an ideal radiating element at a same point in space with equal input power.

Operating frequency: a frequency currently used by a device during communication, including a downlink operating frequency used in downlink communication and an uplink operating frequency used in uplink communication.

The operating frequency of the device may change due to a location change, a cell handover, or the like. According to a stipulation in an existing communications protocol 3GPP 36.521-1, for each band, an antenna in the device corresponds to only one group of antenna impedance parameters, and therefore corresponds to one frequency response curve. In addition, it can be learned from FIG. 1a that the antenna has lower radiation efficiency at each frequency in a sideband area of a band. When the operating frequency of the device is switched from an area near a center frequency of the band to the sideband area, the antenna has lower radiation efficiency, and therefore operating performance of the antenna is reduced.

Figure 1A:
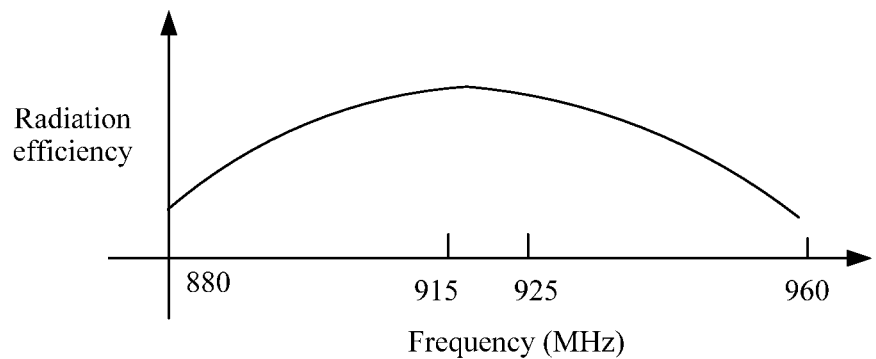
FIG. 1a shows a frequency response curve of an antenna in a band in the prior art.
Figure 1B:
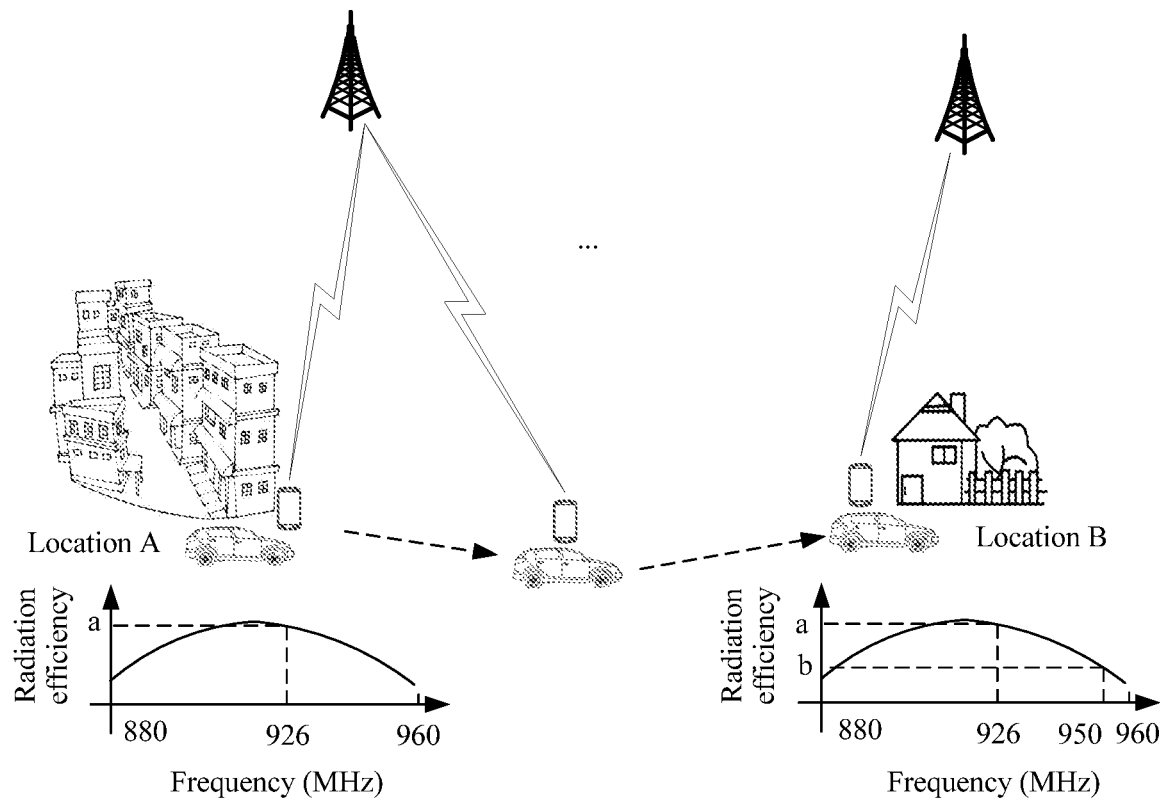
FIG. 1b is a diagram of an operating frequency switching scenario according to an embodiment of the present invention.

For example, referring to a scenario shown in FIG. 1b, during a call, when a user of a mobile phone moves from a location A to a location B, and when a downlink operating frequency used by the mobile phone is switched from 926 MHz to 950 MHz in a sideband area of a band, radiation efficiency of an antenna is reduced from a value a corresponding to 926 MHz to a value b corresponding to 950 MHz. In this case, the antenna corresponds to lower antenna radiation efficiency at 950 MHz, and therefore the antenna has poorer operating performance.

However, according to an antenna resource scheduling method and a device that are provided in the embodiments of the present invention, an impedance of an antenna can be adjusted by adjusting an impedance parameter of an impedance circuit, to adjust a resonance frequency of the antenna. This is equivalent that a frequency response curve is left or right shifted, and therefore radiation efficiency of the antenna in a left sideband area and a right sideband area of a band can be separately improved, thereby improving operating bandwidth of the antenna.

The following describes the technical solutions in the embodiments of the present invention with reference to the accompanying drawings in the embodiments of the present invention. In descriptions of the embodiments of the present invention, "I" means "or" unless otherwise specified. For example, AB may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of the embodiments of the present invention, "a plurality of means "two or more". In addition, in the embodiments of the present invention, a band and a band have a same meaning, and the two terms may be interchangeable.

The device in the embodiments of the present invention is a device in which an antenna is disposed, for example, may be a terminal or a base station. The base station may be specifically a relay station, an access point, or the like, for example, may be a base transceiver station (base transceiver station, BTS) in a global system for mobile communications (global system for mobile communication, GSM) or code division multiple access (code division multiple access, CDMA) network, or may be an NB (NodeB) in wideband code division multiple access (wideband code division multiple access, WCDMA), or may be an eNB or an eNodeB (evolutional NodeB) in LTE. The base station may be alternatively a radio controller in a cloud radio access network (cloud radio access network, CRAN) scenario. The base station may be alternatively a network device in a future 5G network or a network device in a future evolved public land mobile network (public land mobile network, PLMN), or may be a wearable device, a vehicle-mounted device, or the like. The network device in the future 5G network may include a new radio NodeB (new radio NodeB), a next generation NodeB (next generation NodeB, gNB), or a transmission point (transmission point).

The terminal may be user equipment (user equipment, UE), an access terminal, a UE unit, a UE station, a mobile station, a mobile console, a remote station, a remote terminal, a mobile device, a UE terminal, mobile wifi, a wireless communications device, a UE agent, a UE apparatus, or the like. The access terminal may be a cellular phone, a cordless phone, a session initiation protocol (session initiation protocol, SIP) phone, a wireless local loop (wireless local loop, WLL) station, a personal digital assistant (personal digital Assistant, PDA), a handheld device having a wireless communication function, a computing device or another processing device connected to a wireless modem, a vehicle-mounted device, a wearable device, a terminal in a future 5G network, a terminal in a future evolved PLMN network, or the like.

Specifically, in the embodiments of the present invention, the antenna resource scheduling method provided in the embodiments of the present invention is described by using an example in which the terminal is a mobile phone. The following describes in detail components of a mobile phone 10 with reference to an accompanying drawing.

Figure 2:
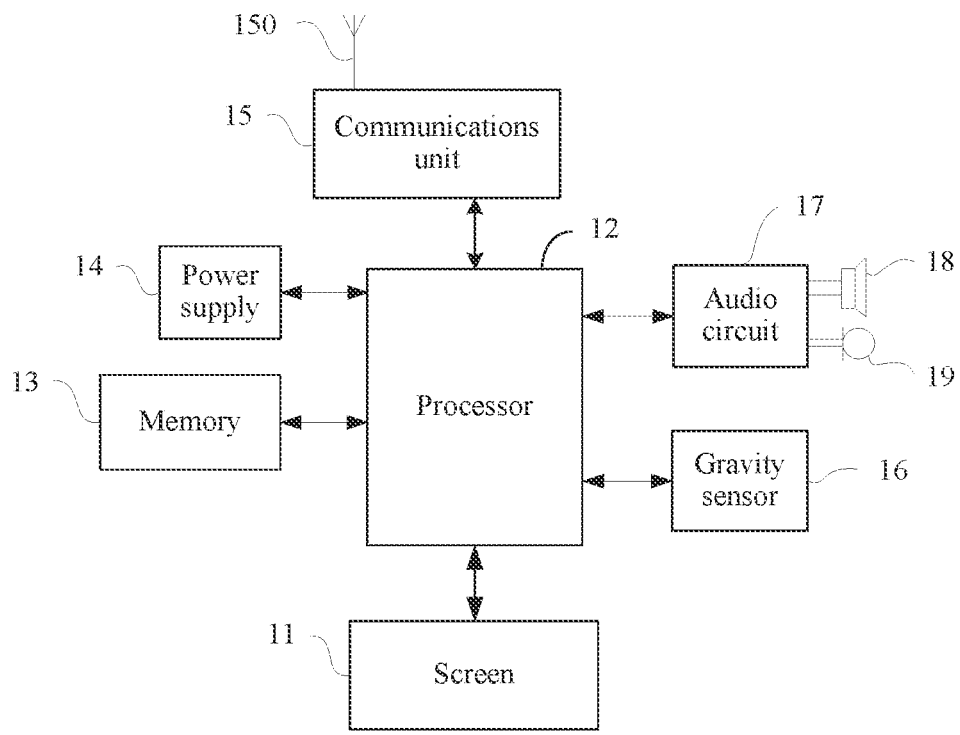
FIG. 2 is a schematic structural diagram of a mobile phone according to an embodiment of the present invention.

As shown in FIG. 2, the mobile phone 10 may include components such as a screen 11, a processor 12, a memory 13, a power supply 14, a communications unit 15, a gravity sensor 16, an audio circuit 17, a loudspeaker 18, and a microphone 19. These components may be connected by using a bus, or may be directly connected. A person skilled in the art may understand that a structure of the mobile phone shown in FIG. 2 constitutes no limitation on the mobile phone, and the mobile phone may include more components than those shown in the figure, or combine some components, or have different component deployments.

The screen 11 may be a display panel, and is configured to present a graphical user interface. The screen 11 may also be a touch display panel, is configured to implement input and output functions of the mobile phone 10, and may collect a touch operation performed by a user on or near the screen 11 (for example, an operation performed by the user on the screen 11 or near the screen 11 by using any proper object or accessory such as a finger or a stylus), and drive a corresponding connected apparatus based on a preset program. The screen 11 may be further configured to display information entered by the user or information (for example, an image captured by using a camera) provided for the user, and various menus of the mobile phone. For example, the screen 11 may be implemented by using a plurality of types such as a resistive type, a capacitive type, an infrared light sensor, and an ultrasonic wave. This is not limited in this embodiment of the present invention. An operation of the user near the screen 11 may be referred to as floating touch, and a display screen on which floating touch can be performed may be implemented by using a capacitive type, an infrared light sensor, an ultrasonic wave, and the like.

It may be understood that in this embodiment of the present invention, in another implementation, the screen 11 may be further configured to: determine a touch object based on a touch operation performed by the user on the screen 11, and report the touch object to the processor 12, so that the processor 12 performs further processing.

The processor 12 is a control center of the mobile phone 10, is connected to all parts of the entire mobile phone by using various interfaces and lines, and performs various functions of the mobile phone 10 and data processing by running or executing a software program and/or a module that are/is stored in the memory 13 and by invoking data stored in the memory 13, to overall monitor the mobile phone 10. In specific implementation, in an embodiment, the processor 12 may include one or more processing units, and an application processor and a modem processor may be integrated into the processor 12. The application processor mainly processes an operating system, a user interface, an application program, and the like, and the modem processor mainly processes wireless communication. It may be understood that, alternatively, the modem processor may not be integrated into the processor 12.

The memory 13 may be configured to store data, a software program, and a module; and may be a volatile memory (volatile memory), for example, a random access memory (random-access memory, RAM), or may be a nonvolatile memory (non-volatile memory), for example, a read-only memory (read-only memory, ROM), a flash memory (flash memory), a hard disk (hard disk drive, HDD), or a solid-state drive (solid-state drive, SSD), or may be a combination of the foregoing types of memories. Specifically, the memory 13 may store program code. The program code is used to enable the processor 12 to perform, by executing the program code, the antenna resource scheduling method provided in the embodiments of the present invention.

The power supply 14 may be a battery, and is logically connected to the processor 12 by using a power management system, to implement functions such as charging management, discharging management, and power consumption management by using the power management system.

The communications unit 15 may be configured to: send received information to the processor 12 for processing, or send a signal generated by the processor 12. The communications unit 15 may include an antenna 150. The antenna 150 is mainly configured to: transmit a radio frequency signal generated by the communications unit 15, and receive a radio frequency signal from space.

The gravity sensor (gravity sensor) 16 may detect values of accelerations in all directions (generally, three axes) of the mobile phone, may detect a value and a direction of gravity when being stationary, and may be used for an application that identifies a mobile phone gesture (such as screen orientation switching, a related game, or magnetometer gesture calibration), a function related to vibration identification (such as a pedometer or a knock), and the like. It should be noted that the mobile phone 10 may further include other sensors such as a pressure sensor, a light sensor, a gyroscope, a barometer, a hygrometer, a thermometer, and an infrared sensor. Details are not described herein.

The audio circuit 17, the loudspeaker 18, and the microphone 19 may provide an audio interface between the user and the mobile phone 10. The audio circuit 17 may transmit, to the loudspeaker 18, an electrical signal converted from received audio data, and the loudspeaker 18 converts the electrical signal into a sound signal for output. In addition, the microphone 19 converts a collected sound signal into an electrical signal, and the audio circuit 17 converts the electrical signal into audio data after receiving the electrical signal, and then outputs the audio data to the communications unit 15 to send the audio data to, for example, another mobile phone, or outputs the audio data to the processor 12 for further processing.

Although not shown, the mobile phone 10 may further include function modules such as a wireless fidelity (wireless fidelity, WiFi) module, a Bluetooth module, and a camera. Details are not described herein.

Figure 3:
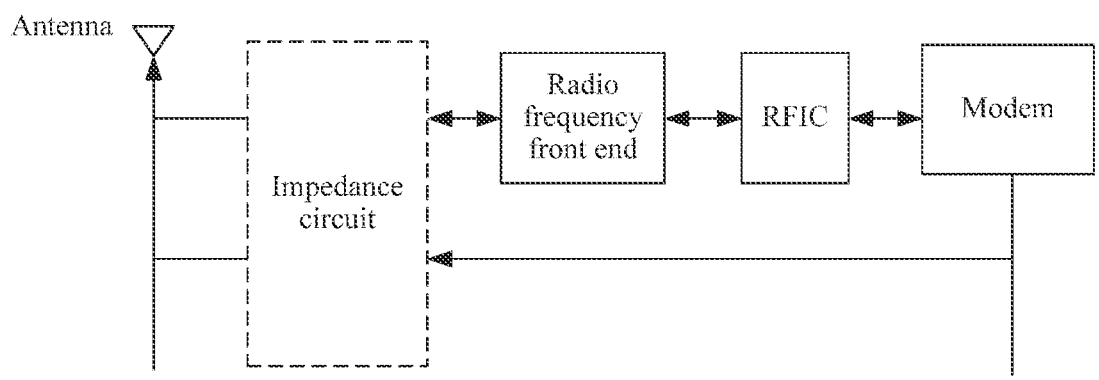
FIG. 3 is a schematic structural diagram of a communications unit according to an embodiment of the present invention.

Specifically, referring to FIG. 3, the communications unit 15 may specifically include an antenna, an impedance circuit, a radio frequency front end, a radio frequency integrated circuit (radio frequency integrated circuit, RFIC), and a modem (modem). The impedance circuit is configured to adjust an impedance of the antenna. The radio frequency front end may include a transmit channel and a receive channel. The transmit channel may include a power amplifier, a filter, or the like, and the receive channel may include a low noise amplifier (low noise amplifier, LNA), a filter, or the like, so that a received radio frequency signal can be picked up from space without distortion and transported to a next frequency conversion circuit, intermediate frequency amplification circuit, or the like. The modem may be configured to: convert a digital signal into a radio frequency analog signal, and transmit the radio frequency analog signal by using the RFIC, the radio frequency front end, and the antenna. A radio frequency analog signal received by the antenna reaches the modem by using the radio frequency front end and the RFIC, and is converted by the modem into a data signal for processing. It may be understood that in the structure shown in FIG. 3, the impedance circuit and the antenna are separately disposed. In another implementation, the impedance circuit may be alternatively disposed in the antenna. This is not specifically limited in this embodiment of the present invention.

To make the objectives, technical solutions, and advantages of the embodiments of the present invention clearer, the antenna resource scheduling method provided in the embodiments of the present invention is described in detail with reference to the mobile phone shown in FIG. 2 and the communications unit shown in FIG. 3. Steps shown in the following embodiment of the present invention may also be performed in any device other than the mobile phone shown in FIG. 2. In addition, although a logical sequence of the antenna resource scheduling method provided in the embodiments of the present invention is shown in the method flowchart, in some cases, the shown or described steps may be performed in a sequence different from the sequence herein.

Figure 4:
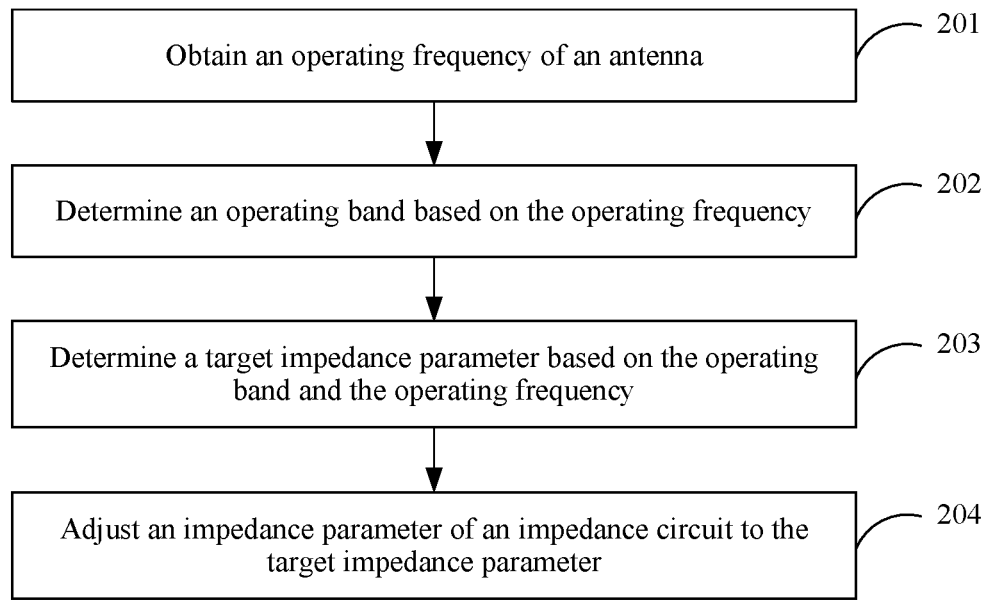
FIG. 4 is a flowchart of an antenna resource scheduling method according to an embodiment of the present invention.

The antenna resource scheduling method provided in the embodiments of the present invention may be applied to a device including an antenna and an impedance circuit of the antenna, and the impedance circuit is configured to adjust an impedance of the antenna. Referring to FIG. 4, the method may include the following steps.

In step 201, the device obtains an operating frequency of the antenna, where the operating frequency is a frequency currently used by the device during communication.

In this embodiment of the present invention, the operating frequency may include an uplink operating frequency and a downlink operating frequency that are paired for using. The uplink operating frequency may be a transmit frequency that is used by the antenna to currently transmit a radio frequency signal, and the downlink operating frequency may be a receive frequency that is used by the antenna to currently receive a radio frequency signal. There is a fixed frequency difference between the downlink operating frequency and the uplink operating frequency, and the fixed frequency difference may be referred to as a duplex frequency separation.

In step 201, the device may first obtain one of the uplink operating frequency and the downlink operating frequency, and then may obtain the other one of the uplink operating frequency and the downlink operating frequency based on the duplex frequency separation.

Specifically, a manner of obtaining, by the device, the operating frequency of the antenna in step 201 may vary with a type of the device. For example, when the device is a mobile phone, a base station may configure an operating frequency of an antenna of the mobile phone when communicating with the mobile phone, and notify the mobile phone of the configured operating frequency. After obtaining a downlink operating frequency, the mobile phone may further obtain an uplink operating frequency of the antenna of the mobile phone based on the downlink operating frequency and a duplex frequency separation.

In step 202, the device determines an operating band based on the operating frequency, where the operating band is a band to which the operating frequency belongs.

After obtaining the operating frequency, the device may determine the band to which the operating frequency belongs, and the band may be referred to as the operating band. Each operating band may include one uplink band and one downlink band, an uplink operating frequency belongs to the uplink band, and a downlink operating frequency belongs to the downlink band.

There is a same duplex frequency separation between a downlink operating frequency and an uplink operating frequency in a same operating band, and there may be different duplex frequency separations between a downlink operating frequency and an uplink operating frequency in different operating bands. For example, Table 2 lists a correspondence between the several operating bands bands in Table 1 and duplex frequency separations.

TABLE 2

| band | Duplex frequency separation |
|---|---|
| 1 | 190 MHz |
| 2 | 80 MHz |
| 3 | 95 MHz |
| 4 | 400 MHz |
| ... | ... |
| 8 | 45 MHz |
| ... | ... |

In step 203, the device determines a target impedance parameter based on the operating band and the operating frequency.

After determining the operating band, the device may determine the target impedance parameter based on the operating band and the operating frequency.

In step 204, the device adjusts an impedance parameter of the impedance circuit to the target impedance parameter.

After determining the target impedance parameter, the device may adjust the impedance parameter of the impedance circuit to the target impedance parameter.

It can be learned that in this embodiment of the present invention, the device can adjust the impedance parameter of the impedance circuit of the antenna based on the operating band and the operating frequency, and therefore can adjust a resonance frequency of the antenna. This is equivalent that the device can left or right shift a frequency response curve of the antenna in the operating band. "Left" is a direction in which a frequency is smaller, and "right" is a direction in which a frequency is larger. Therefore, radiation efficiency of the antenna in a left sideband area and a right sideband area of the operating band can be separately improved, thereby improving operating bandwidth of the antenna.

Figure 5A:
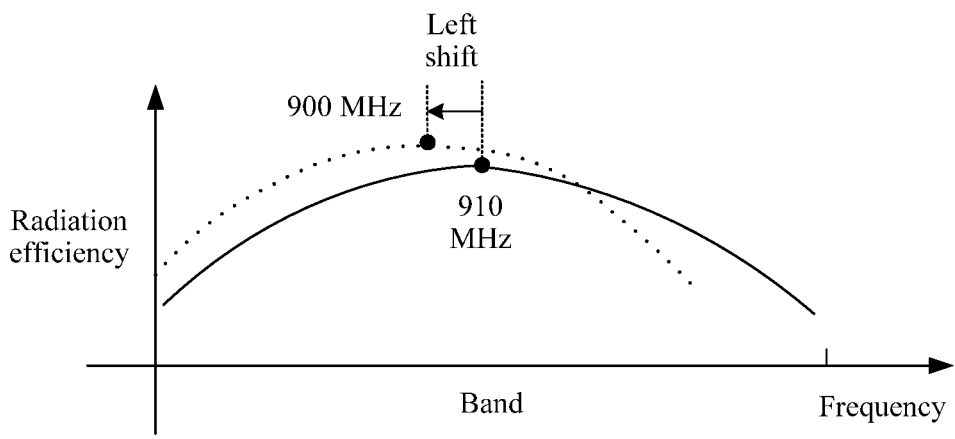
FIG. 5a is a diagram of comparison between frequency response curves corresponding to an antenna in a band according to an embodiment of the present invention.
Figure 5B:
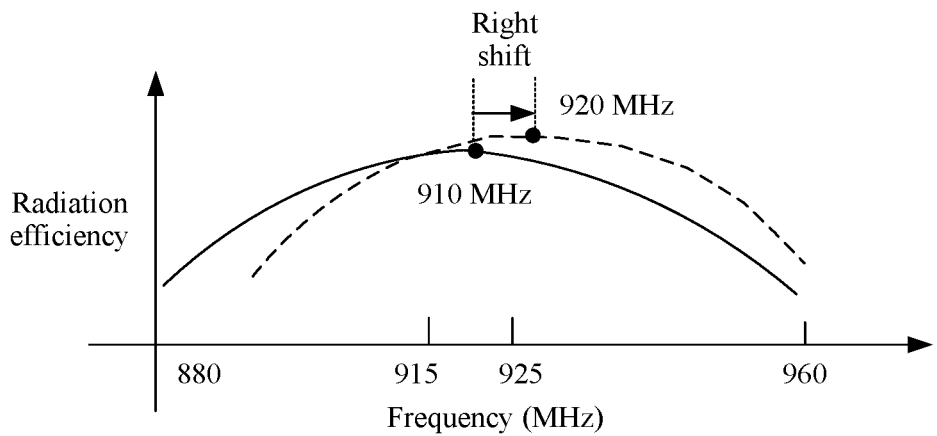
FIG. 5b is another diagram of comparison between frequency response curves corresponding to an antenna in a band according to an embodiment of the present invention.

For example, for a frequency response curve corresponding to an FDD LTE band 8 in the prior art, refer to FIG. 1a. In addition, a resonance frequency of an antenna in FIG. 1a is 910 MHz. Referring to FIG. 5a, the resonance frequency may be left shifted to 900 MHz by adjusting the impedance parameter, and a left-shifted frequency response curve shown by using a dotted line is obtained. Referring to FIG. 5b, the resonance frequency may be right shifted to 920 MHz by adjusting the impedance parameter, and a right-shifted frequency response curve shown by using a dashed line is obtained. It can be learned from FIG. 5a that, when the frequency response curve of the antenna is left shifted, the antenna has higher radiation efficiency in the left sideband area in the operating band. It can be learned from FIG. 5b that, when the frequency response curve of the antenna is right shifted, the antenna has higher radiation efficiency in the right sideband area in the operating band.

Figure 5C:
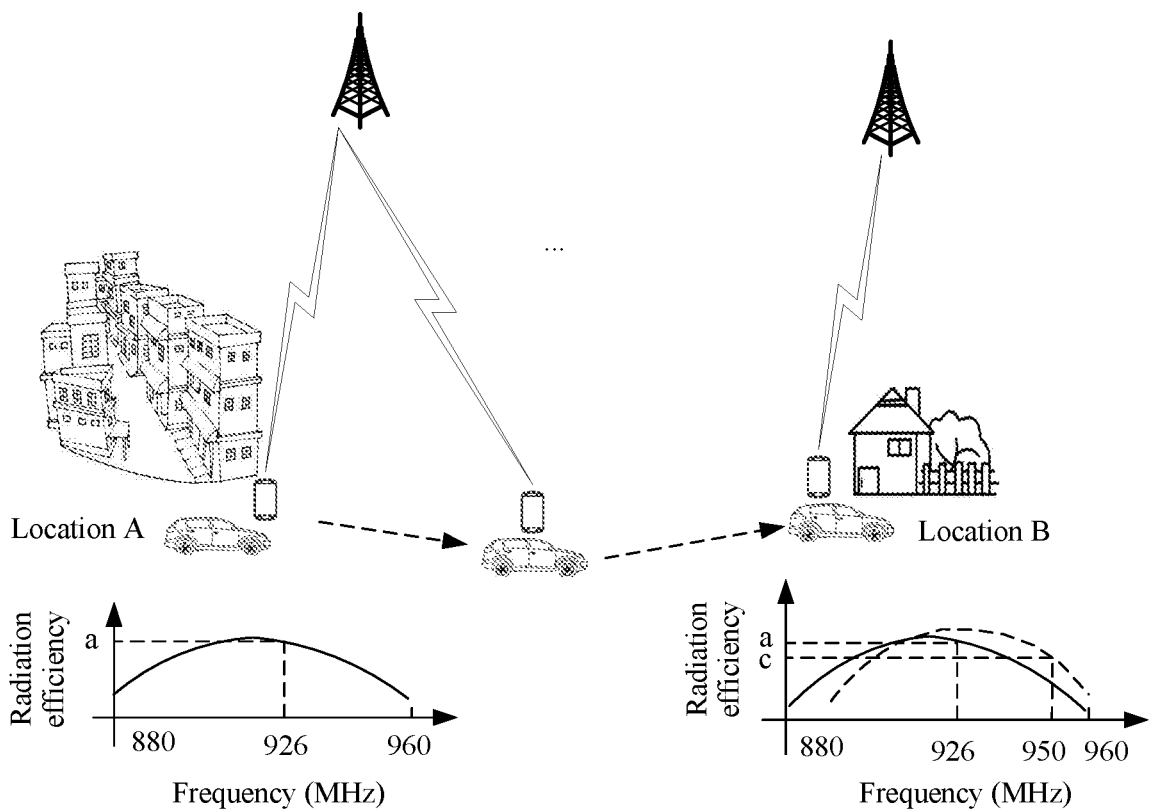
FIG. 5c is a diagram of another operating frequency switching scenario according to an embodiment of the present invention.
Figure 5D:
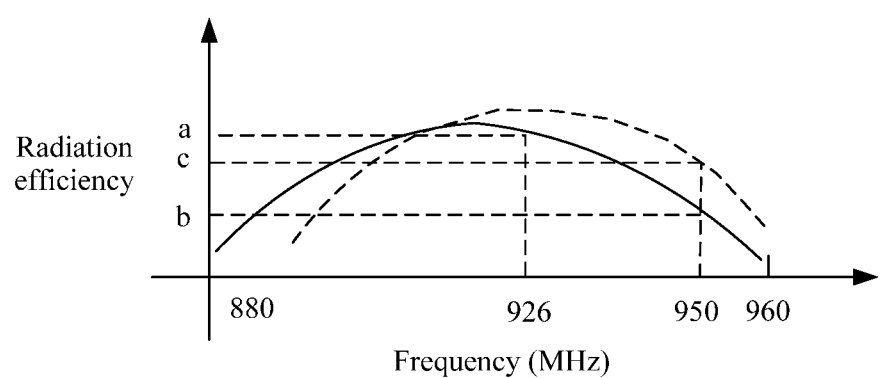
FIG. 5d is a diagram of radiation efficiency comparison according to an embodiment of the present invention.

For example, based on the frequency response curve shown in FIG. 5a or FIG. 5b provided in this embodiment of the present invention, in the scenario shown in FIG. 1b, referring to FIG. 5c, when the downlink operating frequency is switched from 926 MHz to 950 MHz in the sideband area of the band, the radiation efficiency of the antenna is reduced from the value a corresponding to 926 MHz to a value c corresponding to 950 MHz. It can be learned from FIG. 5d that is a diagram of comparison among the value a, the value b, and the value c, the value c of the radiation efficiency that is obtained at 950 MHz in the sideband area by using the method provided in this embodiment of the present invention is higher than the value b in the prior art.

In addition, in a current communications device, a quantity of antennas that can be supported and antenna space that can be supported are usually limited due to requirements of portability, lightness, thinness, and beauty of a mobile terminal. In the prior art, a compromise is usually made on an industrial design (industrial design, ID) of a terminal and other space, to provide more space for improving antenna performance. However, according to the antenna resource scheduling method provided in this embodiment of the present invention, higher FDD antenna bandwidth and higher antenna efficiency can be implemented by flexibly configuring the impedance parameter of the impedance circuit without increasing space resources of the antenna. Therefore, according to the resource scheduling method provided in this embodiment of the present invention, an antenna with high bandwidth and high efficiency can be implemented with fewer space resources by adjusting an impedance of the antenna.

In addition, the operating band in this embodiment of the present invention may be specifically a band corresponding to frequency division duplex FDD. In different communications systems, FDD may correspond to a same quantity of bands and a same frequency range, or correspond to different quantities of bands and different frequency ranges.

Step 203 may have a plurality of specific implementations, which are described below by using examples.

Figure 6:
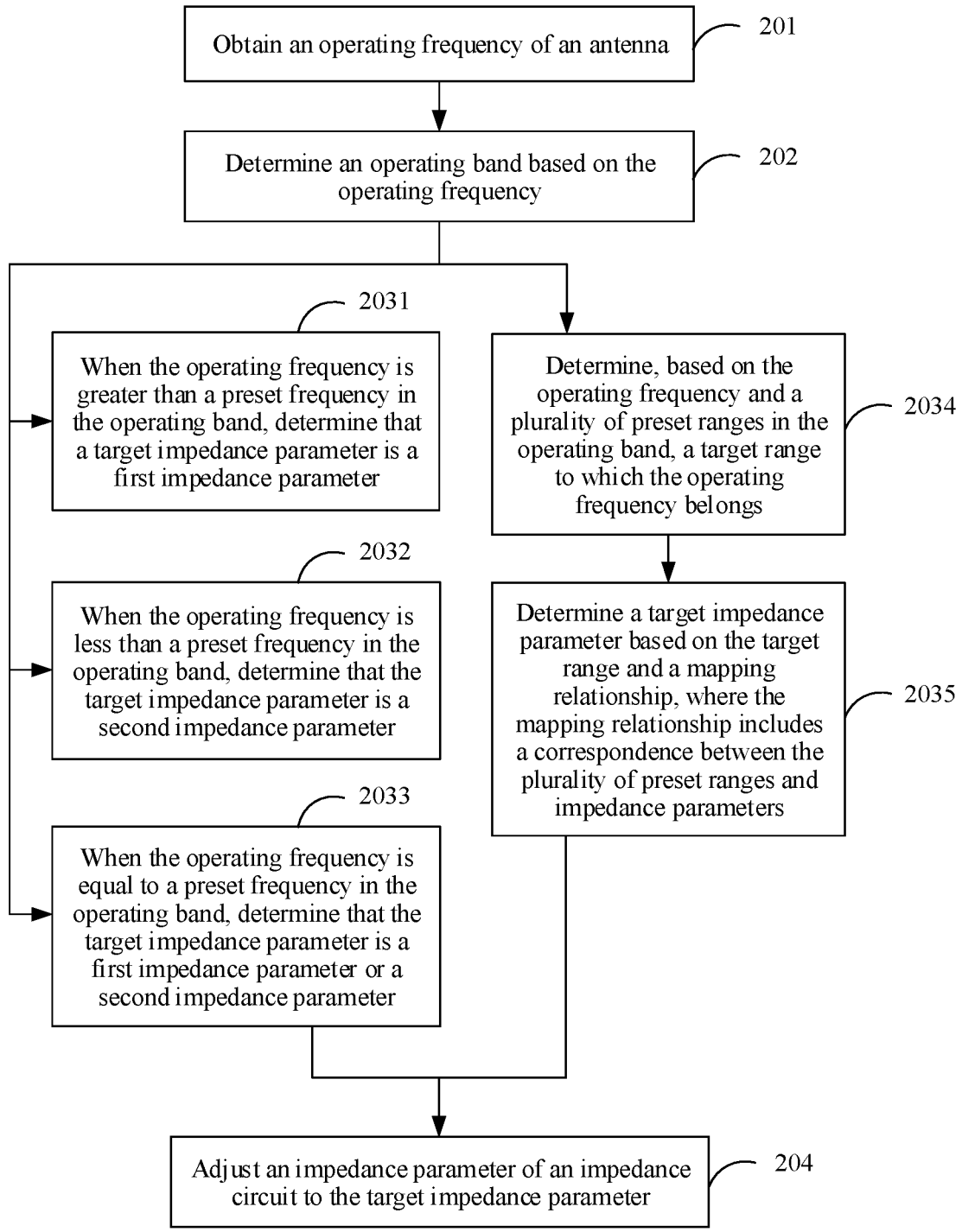
FIG. 6 is a flowchart of another antenna resource scheduling method according to an embodiment of the present invention.

In a first case, referring to FIG. 6, step 203 may include the following steps 2031 2032 and 2033.

In step 2031, when the operating frequency is greater than a preset frequency in the operating band, the device determines that the target impedance parameter is a first impedance parameter.

In step 2032, when the operating frequency is less than a preset frequency in the operating band, the device determines that the target impedance parameter is a second impedance parameter.

In step 2033, when the operating frequency is equal to a preset frequency in the operating band, the device determines that the target impedance parameter is a first impedance parameter or a second impedance parameter.

It should be noted that each band may correspond to one preset frequency. Therefore, there are different preset frequencies in different operating bands.

In this way, the device can determine different target impedance parameters based on a value relationship between the operating frequency and the preset frequency in the operating band to which the operating frequency belongs, and therefore can obtain different frequency response curves based on the different target impedance parameters.

In an FDD system, uplink transmission and downlink transmission may be simultaneously performed. In addition, in an operating band corresponding to FDD, an uplink operating frequency in an uplink band and a downlink operating frequency in a downlink band are paired for using, and therefore the device can determine a target impedance parameter based on either the uplink operating frequency or the downlink operating frequency.

In an implementation of this case, each operating band may include one preset frequency. When the preset frequency belongs to an uplink band of the operating band, the operating frequency in steps 2031 to 2033 is an uplink operating frequency. Alternatively, when the preset frequency belongs to a downlink band of the operating band, the operating frequency in steps 2031 to 2033 is a downlink operating frequency.

In this implementation, if the preset frequency belongs to the uplink band of the operating band, the device may determine the target impedance parameter based on a value relationship between the uplink operating frequency and the preset frequency. If the preset frequency belongs to the downlink band of the operating band, the device may determine the target impedance parameter based on a value relationship between the downlink operating frequency and the preset frequency.

Figure 7:
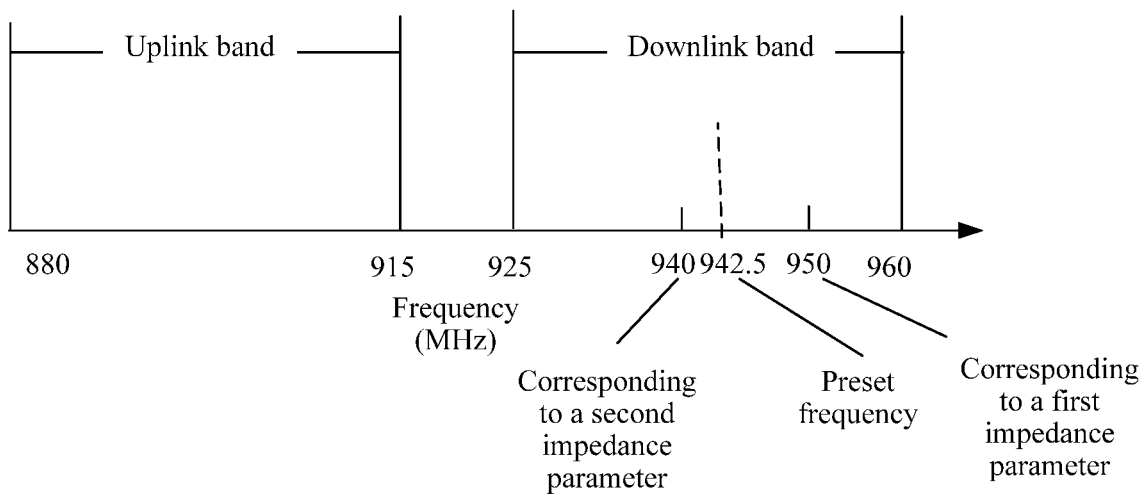
FIG. 7 is a schematic diagram of a preset frequency according to an embodiment of the present invention.

For example, referring to FIG. 7, if the operating band determined in step 202 is the FDD LTE band 8, and the preset frequency is 942.5 MHz and belongs to a downlink band of the FDD LTE band 8, when the downlink operating frequency is 950 MHz, 950 MHz is greater than 942.5 MHz, and therefore the device can determine that the target impedance parameter is the first impedance parameter; or when the downlink operating frequency is 940 MHz, 940 MHz is less than 942.5 MHz, and therefore the device can determine that the target impedance parameter is the second impedance parameter.

In addition, for example, if the operating band determined in step 202 is the FDD LTE band 8, and the preset frequency is 942.5 MHz, for a correspondence among the operating frequency, the preset frequency, and the impedance parameter of the impedance circuit, refer to Table 3.

TABLE 3

| Operating band | Preset frequency | Operating frequency | Target impedance parameter |
|---|---|---|---|
| FDD LTE band 8 | Belonging to a downlink band 942.5 MHz | Downlink operating frequency, greater than 942.5 MHz | Impedance parameter 1 |
| | | Downlink operating frequency, less than 942.5 MHz | Impedance parameter 2 |
| | | Downlink operating frequency, equal to 942.5 MHz | Impedance parameter 1 or impedance parameter 2 |

In another implementation, a preset frequency in each operating band may include an uplink preset frequency and a downlink preset frequency, the uplink preset frequency belongs to an uplink band of the operating band, and the downlink operating frequency belongs to a downlink band of the operating band.

In this implementation, step 2031 may include: when the uplink operating frequency is greater than an uplink preset frequency in the operating band, the device determines that the target impedance parameter is the first impedance parameter. Step 2032 may include: when the uplink operating frequency is less than the uplink preset frequency in the operating band, the device determines that the target impedance parameter is the second impedance parameter. Step 2033 may include: when the uplink operating frequency is equal to the uplink preset frequency in the operating band, the device determines that the target impedance parameter is a first impedance parameter or a second impedance parameter.

Alternatively, step 2031 may include: when the downlink operating frequency is greater than a downlink preset frequency in the operating band, the device determines that the target impedance parameter is the first impedance parameter. Step 2032 may include: when the downlink operating frequency is less than the downlink preset frequency in the operating band, the device determines that the target impedance parameter is the second impedance parameter. Step 2033 may include: when the downlink operating frequency is equal to the downlink preset frequency in the operating band, the device determines that the target impedance parameter is a first impedance parameter or a second impedance parameter.

Figure 8:
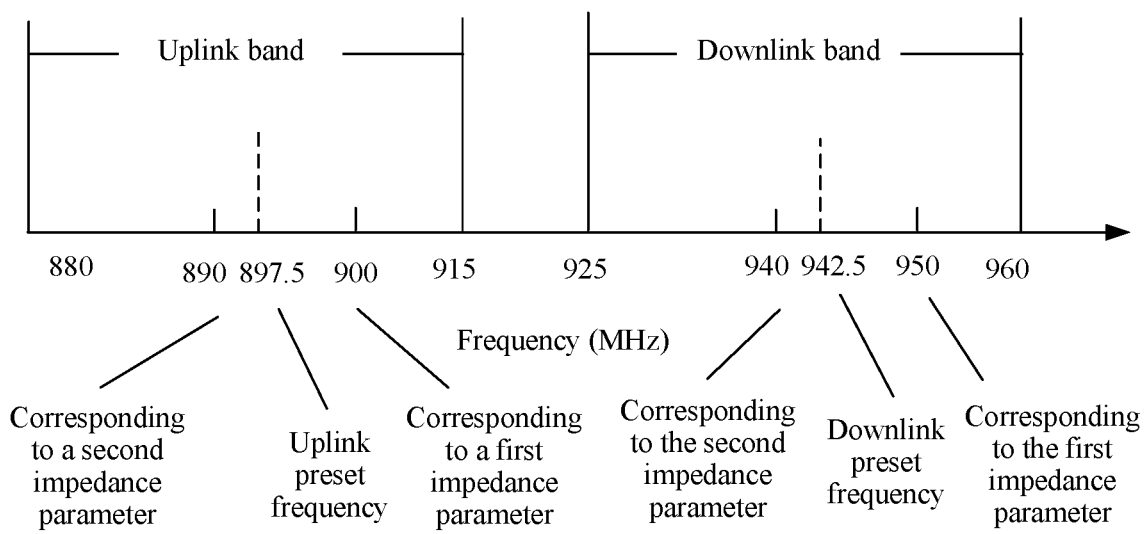
FIG. 8 is a schematic diagram of another preset frequency according to an embodiment of the present invention.

For example, referring to FIG. 8, if the operating band determined in step 202 is the FDD LTE band 8, the uplink preset frequency is 897.5 MHz, and the downlink preset frequency is 942.5 MHz, when the uplink operating frequency is 900 MHz and is greater than the uplink preset frequency that is 897.5 MHz, the device may determine that the target impedance parameter is the first impedance parameter; or when the uplink operating frequency is 890 MHz and is less than the uplink preset frequency that is 897.5 MHz, the device may determine that the target impedance parameter is the second impedance parameter. When the downlink operating frequency is 950 MHz and is greater than the downlink preset frequency that is 942.5 MHz, the device may determine that the target impedance parameter is the first impedance parameter; or when the downlink operating frequency is 940 MHz and is less than the uplink preset frequency that is 942.5 MHz, the device may determine that the target impedance parameter is the second impedance parameter.

In a second case, referring to FIG. 6, step 203 may include the following steps 2034 and 2035.

In step 2034, the device determines, based on the operating frequency and a plurality of preset ranges in the operating band, a target range to which the operating frequency belongs, where the target range is a preset range to which the operating frequency belongs.

In step 2035, the device determines the target impedance parameter based on the target range and a mapping relationship, where the mapping relationship includes a correspondence between the plurality of preset ranges and impedance parameters.

In this way, the device can determine different target impedance parameters based on different target ranges to which the operating frequency belongs, and therefore can obtain different frequency response curves based on the different target impedance parameters.

In an implementation, when the plurality of preset ranges belong to an uplink band of the operating band, the operating frequency in step 2034 and step 2035 is an uplink operating frequency. Alternatively, when the plurality of preset ranges belong to a downlink band of the operating band, the operating frequency in step 2034 and step 2035 is a downlink operating frequency.

In this implementation, when the plurality of preset ranges belong to the uplink band of the operating band, the device may determine, based on the uplink operating frequency and the plurality of preset ranges in the operating band, the target range to which the operating frequency belongs, to determine the target impedance parameter based on the target range. When the plurality of preset ranges belong to the downlink band of the operating band, the device may determine, based on the downlink operating frequency and the plurality of preset ranges in the operating band, the target range to which the operating frequency belongs, to determine the target impedance parameter based on the target range.

Figure 9:
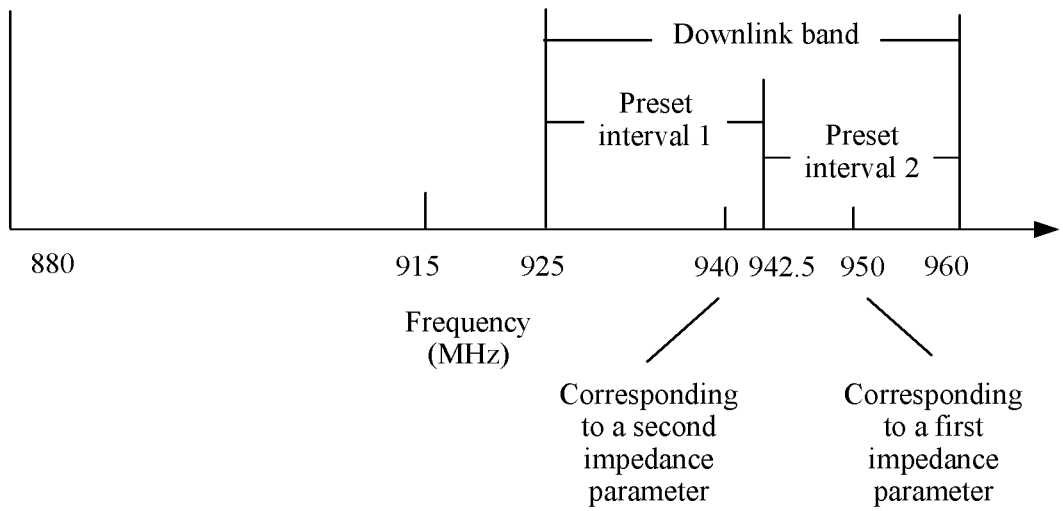
FIG. 9 is a schematic diagram of a preset range according to an embodiment of the present invention.

For example, referring to FIG. 9, if the operating band determined in step 202 is the FDD LTE band 8, the FDD LTE band 8 includes two preset ranges: a preset range 1 [925 MHz, 942.5 MHz) and a preset range 2 [942.5 MHz, 960 MHz]. The two preset ranges belong to the downlink band. When the downlink operating frequency is 950 MHz, a target range to which the downlink operating frequency belongs is the preset range 2, and the device may determine that the target impedance parameter is a first impedance parameter that has a mapping relationship with the preset range 2. Alternatively, when the downlink operating frequency is 940 MHz, a target range to which the downlink operating frequency belongs is the preset range 1, and the device may determine that the target impedance parameter is a second impedance parameter that has a mapping relationship with the preset range 1.

For example, if the operating band determined in step 202 is the FDD LTE band 8, and a downlink band of the FDD LTE band 8 includes the preset range 1 and the preset range 2, for a correspondence among the operating frequency, the preset frequency, and the impedance parameter of the impedance circuit, refer to Table 4.

TABLE 4

| Operating band | Preset range | Operating frequency | Target range | Target impedance parameter |
|---|---|---|---|---|
| FDD LTE band 8 | Belonging to a downlink band Preset range 1 Preset range 2 | Downlink operating frequency | Preset range 2 Preset range 1 | Impedance parameter 3 Impedance parameter 4 |

Figure 10:
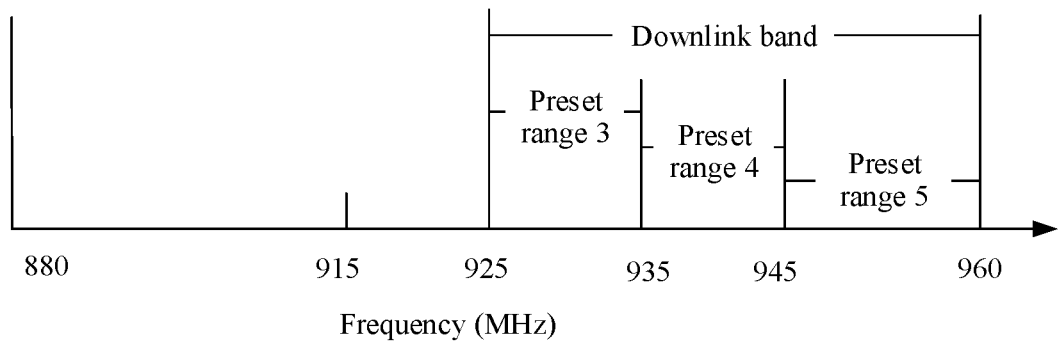
FIG. 10 is a schematic diagram of another preset range according to an embodiment of the present invention.

In addition, the plurality of preset ranges in this embodiment of the present invention may be alternatively at least two preset ranges. This is not limited herein. For example, referring to FIG. 10, the downlink band of the FDD LTE band 8 may include three preset ranges: a preset range 3 [925 MHz, 935 MHz), a preset range 4 [935 MHz, 945 MHz), and a preset range 5 [945 MHz, 960 MHz].

In another implementation, an uplink band and a downlink band include a same quantity of preset ranges, and preset ranges in the uplink band are in a one-to-one correspondence with preset ranges in the downlink band. An uplink operating frequency and a downlink operating frequency in two preset ranges that correspond to each other are paired for using. In the mapping relationship, two preset ranges that correspond to each other in the uplink band and the downlink band correspond to a same impedance parameter. In this implementation, the device may determine, based on the uplink operating frequency and the plurality of preset ranges in the uplink band, a target range to which the uplink operating frequency belongs, to determine the target impedance parameter; or the device may determine, based on the downlink operating frequency and the plurality of preset ranges in the downlink band, a target range to which the downlink operating frequency belongs, to determine the target impedance parameter.

Figure 11:
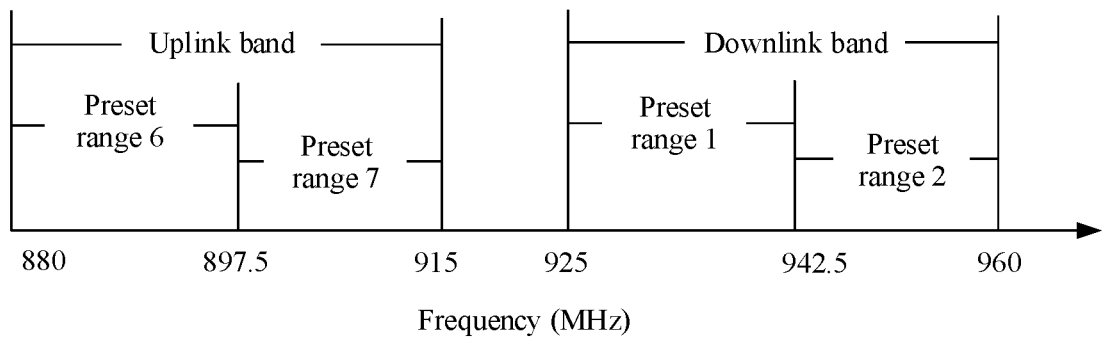
FIG. 11 is a schematic diagram of another preset range according to an embodiment of the present invention.

For example, referring to FIG. 11, a preset range 6 in the uplink band corresponds to a preset range 1 in the downlink band, and a preset range 7 in the uplink band corresponds to a preset range 2 in the downlink band. Referring to Table 5, when the target range to which the uplink operating frequency belongs is the preset range 6, or the target range to which the downlink operating frequency belongs is the preset range 1, the target impedance parameter is an impedance parameter 5; or when the target range to which the uplink operating frequency belongs is the preset range 7, or the target range to which the downlink operating frequency belongs is the preset range 2, the target impedance parameter is an impedance parameter 6.

TABLE 5

| Operating band | Operating frequency | Target range | Target impedance parameter |
|---|---|---|---|
| FDD LTE band 8 | Uplink operating frequency | Preset range 6 | Impedance parameter 5 |
| | Downlink operating frequency | Preset range 1 | |
| | Uplink operating frequency | Preset range 7 | Impedance parameter 6 |
| | Downlink operating frequency | Preset range 2 | |

It should be noted that a same target impedance parameter is used for the uplink operating frequency and the corresponding downlink operating frequency. Alternatively, different target impedance parameters may be used for the uplink operating frequency and the corresponding downlink operating frequency, in other words, different impedance parameters are set for the uplink operating frequency and the corresponding downlink operating frequency. A specific used manner may be designed based on an actual product design requirement. This is not specifically limited in this embodiment of the present invention.

In addition, it may be understood that similar to the second case, in the first case, the preset frequency may also be used to divide the operating band into a plurality of preset ranges. For example, in the case shown in FIG. 7, the preset frequency 942.5 MHz may be used to divide the downlink band of the operating band into two preset ranges: the preset range 1 and the preset range 2 that are shown in FIG. 9.

Figure 12:
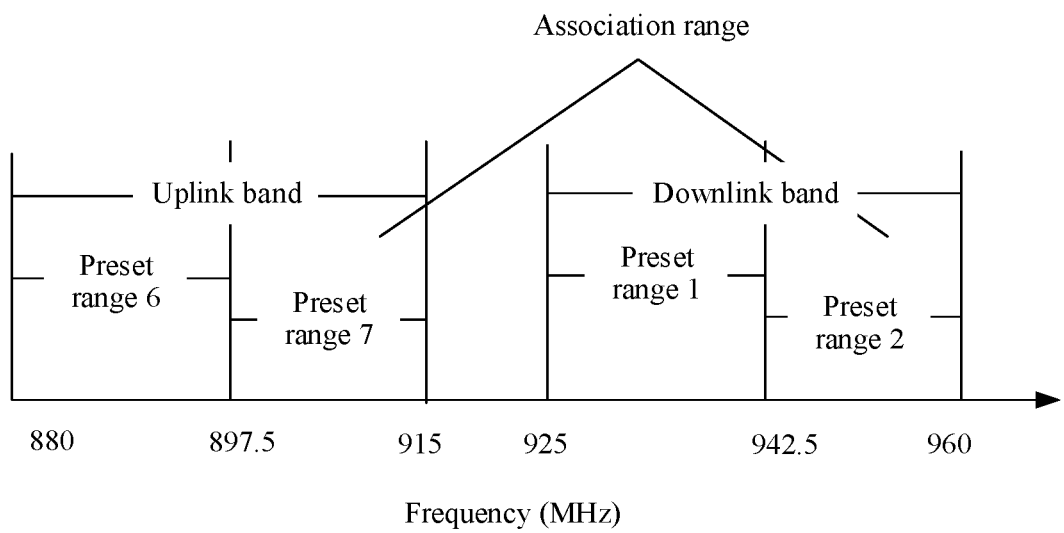
FIG. 12 is a schematic diagram of an association range according to an embodiment of the present invention.
Figure 13:
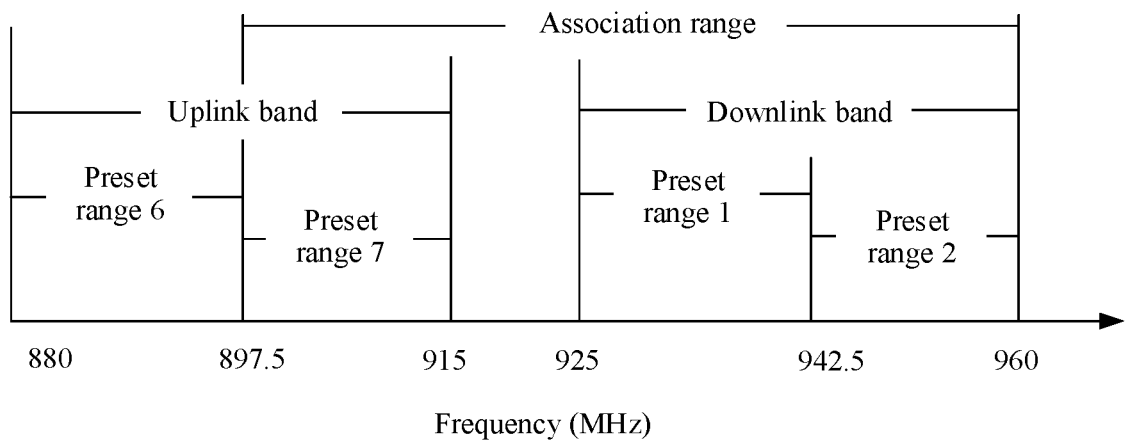
FIG. 13 is a schematic diagram of another association range according to an embodiment of the present invention.

In this embodiment of the present invention, a mapping relationship between a preset range and an impedance parameter may be configured in a test phase. Specifically, a target impedance parameter configured in the test phase may enable an average value or a minimum value of radiation efficiency of the antenna at each frequency in an association range of the preset range to be greater than or equal to a preset value, in other words, enable an average value or a minimum value of radiation efficiency of the antenna at each frequency in an association range of the target range to which the operating frequency belongs to be greater than or equal to the preset value, in other words, the antenna has higher radiation efficiency at each frequency in the association range. The association range includes the target range, and a specific size of the association range may be set based on an actual requirement. For example, in a manner, in a case shown in FIG. 11, when the target range is the preset range 7 or the preset range 2, the association range may be an range shown in FIG. 12, or may be an range shown in FIG. 13.

Therefore, the antenna also has higher radiation efficiency at an operating frequency in the association range. Therefore, regardless of which operating frequency is used by the device, radiation efficiency of the antenna at the operating frequency can be higher by adjusting the impedance parameter of the impedance circuit. Therefore, according to the method provided in this embodiment of the present invention, radiation efficiency in a sideband in the operating band can be improved, and radiation efficiency of the antenna at any operating frequency in the operating band can also be improved. Therefore, when the operating frequency is switched due to a location change, a cell handover, or the like, higher radiation efficiency of the antenna can be obtained according to the method provided in this embodiment of the present invention.

In addition, because bandwidth of the antenna is usually a frequency range in which radiation efficiency is higher than a preset threshold, the bandwidth of the antenna can be further improved according to the antenna resource scheduling method provided in this embodiment of the present invention, on a basis that radiation efficiency of the antenna at each operating frequency can be higher.

The radiation efficiency may include one or more impedance parameters that are used to describe antenna sending/receiving efficiency. For example, the radiation efficiency may include at least one of antenna efficiency, an antenna gain, or an over the air (over the air, OTA) impedance parameter, and another related impedance parameter. The OTA impedance parameter may include at least one of total radiated power (total radiated power, TRP), near horizon partial radiated power (near horizon partial radiated power, NHPRP), total isotropic sensitivity (total isotropic sensitivity, TIS), or the like.

In this embodiment of the present invention, the impedance circuit in FIG. 3 may appear to be capacitive circuit or inductive. Specifically, the impedance circuit may include at least one of a capacitor component, an inductor component, or an adjustable circuit. The adjustable circuit may include at least one matching circuit and/or at least one filter, and the matching circuit may include an inductor and/or a capacitor. In this way, the resonance frequency of the antenna can be adjusted by adjusting an impedance parameter corresponding to the capacitor component, the inductor component, or the adjustable circuit in the impedance circuit, to obtain different frequency response curves.

Specifically, when the impedance circuit includes the capacitor component, the impedance circuit may further include a tuner, and an output voltage of the tuner is used to control a capacitance value of the capacitor component. When the impedance circuit includes the adjustable circuit, the impedance circuit further includes at least one switch, configured to select at least one matching circuit and/or filter.

For example, corresponding to Table 4, when the target range is the preset range 2, the target impedance parameter may be specifically an impedance parameter 3 in Table 6, and the impedance parameter 3 may correspond to a frequency response curve 1; or when the target range is the preset range 1, the target impedance parameter may be specifically an impedance parameter 4 in Table 6, and the impedance parameter 4 may correspond to a frequency response curve 2.

TABLE 6

| Target range | Target impedance parameter | Switch selection status | Output voltage of a tuner | Capacitance value of a capacitor component | Frequency response curve |
|---|---|---|---|---|---|
| Preset range 2 | Impedance parameter 3 | Select a matching circuit 1 | 18 V | 2.2 pF | Frequency response curve 1 |
| Preset range 1 | Impedance parameter 4 | Select a matching circuit 2 | 15 V | 2.5 pF | Frequency response curve 2 |

Figure 14:
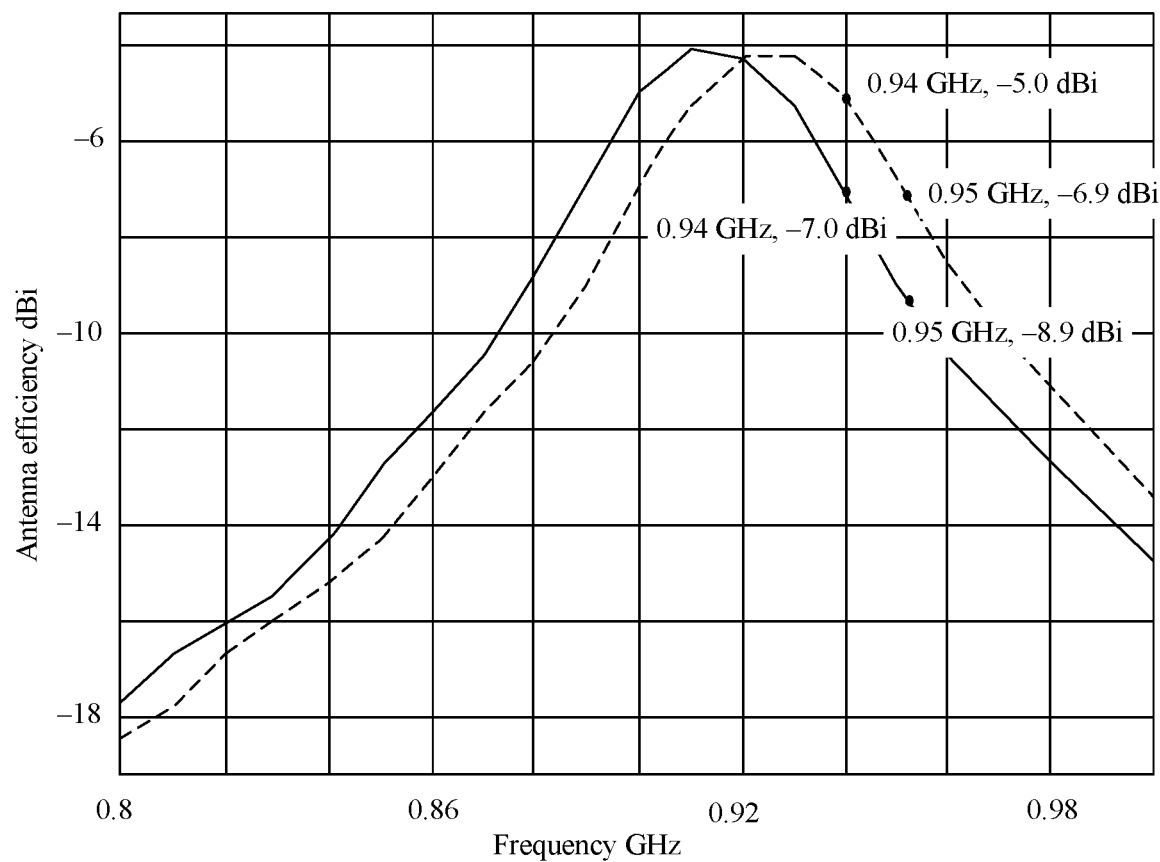
FIG. 14 is another diagram of comparison between frequency response curves of an antenna in a band according to an embodiment of the present invention.

In addition, referring to FIG. 14, of the present invention further provides a diagram of comparison between frequency response curves obtained through experiment. A solid line represents a frequency response curve corresponding to the prior art, a dashed line represents the frequency response curve 1 in Table 6, a horizontal axis represents a frequency, and a vertical axis represents antenna efficiency. It can be learned, from comparison between the dashed line and the solid line in FIG. 14, that a resonance frequency of the dashed line is right shifted by 10 MHz, and antenna efficiency in a sideband area of an operating band can be improved by a maximum of 2 dBi.

In addition, the foregoing embodiment of the present invention is mainly described by using the FDD LTE band 8 as an example. The antenna resource scheduling method provided in this embodiment of the present invention is also applicable to a band other than the FDD LTE band 8, and details are not described herein.

In addition, it should be noted that the antenna resource scheduling method provided in this embodiment of the present invention is applicable to any antenna (for example, a main antenna or a diversity antenna) in the device.

The solutions provided in the embodiments of the present invention are mainly described above from a perspective of device. It may be understood that, to implement the foregoing functions, the device includes corresponding hardware structures and/or software modules for executing the functions. A person skilled in the art should easily be aware that, in combination with the examples described in the embodiments disclosed in this specification, algorithms steps can be implemented in the present invention in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, the device may be divided into function modules based on the foregoing method examples. For example, function modules may be obtained through division based on corresponding functions, or two or more functions may be integrated into one processing module. The integrated module may be implemented in a form of hardware, or may be implemented in a form of a software function module. It should be noted that, in the embodiments of the present invention, the module division is an example and is merely logical function division, and there may be another division manner in actual implementation.

Figure 15:
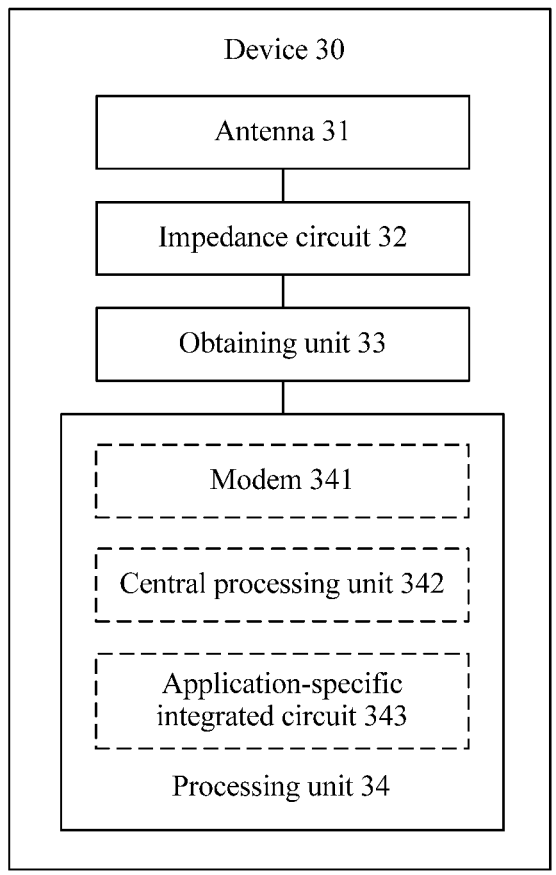
FIG. 15 is a schematic structural diagram of a device according to an embodiment of the present invention.

When function modules are obtained through division based on corresponding functions, FIG. 15 is a possible schematic composition diagram of the device in the foregoing method embodiment. As shown in FIG. 15, the device 30 may include an antenna 31, an impedance circuit 32 of the antenna, an obtaining unit 33, and a processing unit 34, and the processing unit 34 may include a modem 341 or a central processing unit CPU 342. Further, the processing unit 34 may include an application-specific integrated circuit 343, which may be, for example, a field programmable gate array (field programmable gate array, FPGA).

The antenna 31 may be configured to receive or transmit a radio frequency signal. The impedance circuit 32 may be configured to adjust an impedance of the antenna 31. The obtaining unit 33 may be configured to obtain an operating frequency of the antenna, where the operating frequency is a frequency currently used by the device during communication. The processing unit 34 may be configured to: determine an operating band based on the operating frequency, where the operating band is a band to which the operating frequency belongs; determine a target impedance parameter based on the operating band and the operating frequency; and adjust an impedance parameter of the impedance circuit to the target impedance parameter. In addition, the processing unit 34 may be specifically configured to support the device 30 in performing step 2031, step 2032, or step 2033 in FIG. 6 or performing step 2034 and step 2035 in FIG. 6.

It should be noted that, all related content of the steps in the foregoing method embodiment can be cited in function descriptions of corresponding function modules, and details are not described herein.

The device 30 provided in this embodiment of the present invention is configured to perform the foregoing antenna resource scheduling method, and therefore can achieve the same effect as the foregoing antenna resource scheduling method.

Figure 16:
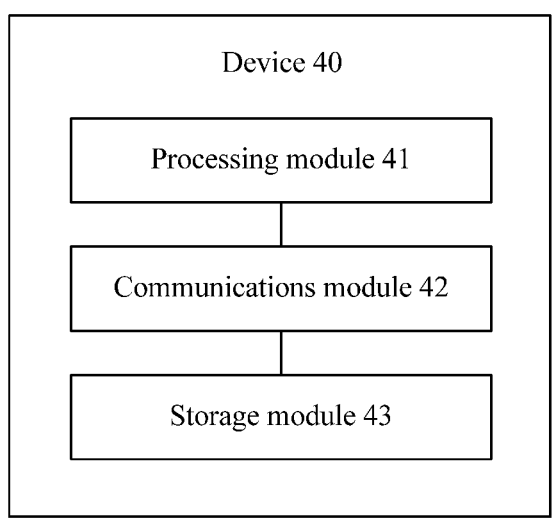
FIG. 16 is a schematic structural diagram of another device according to an embodiment of the present invention.

When an integrated unit is used, FIG. 16 is another possible schematic composition diagram of the device in the foregoing embodiment. As shown in FIG. 16, the device 40 may include a processing module 41 and a communications module 42.

The processing module 41 is configured to control and manage actions of the device. For example, the processing module 41 is configured to support the device in performing steps 202 to 204 in FIG. 4, and steps 2021 and 2022 or steps 2033 and 2034 in FIG. 6, and/or is configured to perform another process of the technology described in this specification. The processing module 41 or the communications module 42 is configured to support the device in performing step 201 in FIG. 4. The device 40 may further include a storage module 43, configured to store program code and data of the device.

The processing module 41 may be a processor or a controller. The processing module 41 may implement or execute various example logical blocks, modules, and circuits described with reference to the present invention. The processor may be alternatively a combination implementing a computing function, for example, a combination including one or more microprocessors or a combination of a microprocessor (digital signal processor, DSP) and a microprocessor. The communications module 42 may be a transceiver, a transceiver circuit, a communications interface, or the like. The storage module 43 may be a memory.

The foregoing descriptions of the implementations allow a person skilled in the art to understand that, for the purpose of convenient and brief description, only division of the foregoing function modules is used as an example for illustration. In actual application, the foregoing functions can be allocated to different function modules for implementation based on a requirement, to be specific, an inner structure of an apparatus is divided into different function modules to implement all or some of the functions described above.

In the several embodiments provided in the present invention, it should be understood that the disclosed device and method may be implemented in other manners. For example, the described apparatus embodiments are merely examples. For example, the module or unit division is merely logical function division, and there may be another division manner in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, to be specific, may be located in one place, or may be distributed in a plurality of different places. Some or all of the units may be selected based on an actual requirement to achieve the objectives of the solutions of the embodiments.

In addition, function units in the embodiments of the present invention may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of the present invention essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the method described in the embodiments of the present invention. The storage medium includes: any medium that can store program code, such as a USB flash drive, a removable hard disk, a read-only memory (read-only memory, ROM), a random access memory (random access memory, RAM), a magnetic disk, or an optical disc. The foregoing descriptions are merely specific implementations of the present invention, but are not intended to limit the protection scope of the present invention. Any variation or replacement within the technical scope disclosed in the present invention shall fall within the protection scope of the present invention. Therefore, the protection scope of the present invention shall be subject to the protection scope of the claims.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, applied to a device, wherein the device comprises an antenna and an impedance circuit of the antenna, and the method comprises:

obtaining, by the device, an operating frequency of the antenna, wherein the operating frequency is a frequency currently used by the device during communication;

determining, by the device, an operating band based on the operating frequency, wherein the operating band is a band to which the operating frequency belongs;

determining, by the device, a target impedance parameter based on the operating band and the operating frequency; and adjusting, by the device, an impedance parameter of the impedance circuit to the target impedance parameter, wherein the step of determining a target impedance parameter based on the operating band and the operating frequency is specifically:

determining, by the device, that the target impedance parameter is a first impedance parameter when the operating frequency is greater than a preset frequency in the operating band; or determining, by the device, that the target impedance parameter is a second impedance parameter when the operating frequency is less than a preset frequency in the operating band; or determining, by the device, that the target impedance parameter is a first impedance parameter or a second impedance parameter when the operating frequency is equal to a preset frequency in the operating band, wherein the step of determining a target impedance parameter based on the operating band and the operating frequency is specifically:

determining, by the device based on the operating frequency and a plurality of preset ranges in the operating band, a target range to which the operating frequency belongs, wherein the target range is a preset range to which the operating frequency belongs; and determining, by the device, the target impedance parameter based on the target range and a mapping relationship, wherein the mapping relationship comprises a correspondence between the plurality of preset ranges and impedance parameters.

2. The method according to claim 1, wherein the operating band is a band corresponding to frequency division duplex (FDD).

3. A device, comprising an antenna, an impedance circuit of the antenna, a processor, a memory, wherein the memory is configured to store an instruction; and the processor is configured to invoke the instruction stored in the memory, to enable the device to:
  obtain an operating frequency of the antenna, wherein the operating frequency is a frequency currently used by the device during communication;
  determine an operating band based on the operating frequency, wherein the operating band is a band to which the operating frequency belongs;
  determine a target impedance parameter based on the operating band and the operating frequency; and
  adjust an impedance parameter of the impedance circuit to the target impedance parameter,
  wherein a first impedance parameter is determined as the target impedance parameter when the operating frequency is greater than a preset frequency in the operating band;
  a second impedance parameter is determined as the target impedance parameter when the operating frequency is less than a preset frequency in the operating band; and
  the first impedance parameter or the second impedance parameter is determined as the target impedance parameter when the operating frequency is equal to a preset frequency in the operating band.

4. The device according to claim 3, wherein a target range to which the operating frequency belongs is determined, based on the operating frequency and a plurality of preset ranges in the operating band, wherein the target range is a preset range to which the operating frequency belongs; and
  the target impedance parameter is determined based on the target range and a mapping relationship, wherein the mapping relationship comprises a correspondence between the plurality of preset ranges and impedance parameters.

5. A non-transitory computer readable storage medium, comprising an instruction, wherein when the instruction runs on a device and the device comprises an antenna and an impedance circuit of the antenna, the device is enabled to:
  obtain an operating frequency of the antenna, wherein the operating frequency is a frequency currently used by the device during communication;
  determine an operating band based on the operating frequency, wherein the operating band is a band to which the operating frequency belongs;
  determine a target impedance parameter based on the operating band and the operating frequency; and
  adjust an impedance parameter of the impedance circuit to the target impedance parameter,
  wherein a first impedance parameter is determined as the target impedance parameter when the operating frequency is greater than a preset frequency in the operating band;
  a second impedance parameter is determined as the target impedance parameter when the operating frequency is less than a preset frequency in the operating band; and
  the first impedance parameter or the second impedance parameter is determined as the target impedance parameter when the operating frequency is equal to a preset frequency in the operating band.

6. The non-transitory computer readable storage medium according to claim 5, wherein a target range to which the operating frequency belongs is determined, based on the operating frequency and a plurality of preset ranges in the operating band, wherein the target range is a preset range to which the operating frequency belongs; and
  the target impedance parameter is determined based on the target range and a mapping relationship, wherein the mapping relationship comprises a correspondence between the plurality of preset ranges and impedance parameters.

7. The non-transitory computer readable storage medium according to claim 5, the operating band is a band corresponding to frequency division duplex (FDD).

* * * * *